Dec. 22, 1970  D. ORLANDO  3,550,108

SHAFT ROTATION FAILURE SYSTEM

Filed May 6, 1968

INVENTOR
Daniel Orlando
BY Pendleton, Neuman,
Seibold & Williams
Attorneys

United States Patent Office 3,550,108
Patented Dec. 22, 1970

3,550,108
SHAFT ROTATION FAILURE SYSTEM
Daniel Orlando, Brookfield, Wis., assignor to Globe Union Inc., Milwaukee, Wis., a corporation of Delaware
Filed May 6, 1968, Ser. No. 733,205
Int. Cl. H01h 47/18, 7/00
U.S. Cl. 340—271
10 Claims

ABSTRACT OF THE DISCLOSURE

System for providing a positive indication of the failure of rotation of a shaft, having electrical circuitry for energizing a timer in alternate positions of a control means during rotation of the shaft, with means provided for resetting the timer following actuation of the control means to one position and for permitting reenergization of the timer only after a certain time interval, an alarm circuit being energized when the timer is energized for a time interval greater than the time of operation of the control means during rotation of the shaft at normal speed.

---

This invention relates to a shaft rotation failure detector system and more particularly to a comparatively simple and inexpensive system for developing a positive indication of the failure of rotation of a shaft, especially a slow moving shaft.

In certain systems, it is desirable to develop an indication of the failure of rotation of a shaft and particularly in the case of relatively slow moving shafts where failure of continuous rotation is not immediately apparent. For example, in bucket elevators or other material moving equipment such as used in many manufacturing operations, if a drive belt or other drive connection should fail, the material is not removed or is not removed quickly enough, and generally the failure is not discovered until it is too late to do something about it. To correct the apparatus after such failure requires tearing down the whole structure which is difficult, time-consuming and costly.

Arrangements have heretofore been proposed for the detection of the failure of rotation of a shaft but such systems have been relatively complex, using a large number of component parts subject to failure, and have not been entirely reliable. In some systems, if the shaft should stop at certain positions, the failure of rotation will not be detected.

This invention was evolved with the general object of overcoming the disadvantages of prior art arrangements and of providing a system which is operative to provide a positive and reliable indication of the failure of rotation of a shaft.

Another object of the invention is to provide a system which is comparatively simple and inexpensive in construction, using a minimum number of component parts subject to failure.

According to this invention, a control means, preferably an electrical switch operated by a shaft-driven cam, is alternately placed in first and second conditions, and timer means are provided, arranged to develop an output signal in response to energization for a certain time interval greater than the time interval between actuations of the control means during rotation of the shaft at a normal speed. Reset means are provided for resetting the timer means only in response to actuation of the control means from the second condition to the first condition and the timer means is energized following actuation of the control means to the first condition and is maintained energized with the control means in both the first and second conditions. With this comparatively simple arrangement, a positive indication is obtained of the failure of rotation since the timer means will remain energized to develop an output signal if the shaft should stop its rotation, regardless of its position.

In accordance with a specific feature of the invention, storage means, preferably in the form of a capacitor, are provided for storing energy in the second condition of the control means and holding means are provided for utilizing the energy stored to allow resetting of the timer means and to prevent energization thereof until after elapse of a certain time interval following actuation of the control means to the first condition. Preferably, the holding means comprises a relay in parallel with the capacitor, and to permit rapid energization of the relay while allowing a delayed deenergization thereof, a diode is provided, connected in series with the relay.

Another specific feature relates to the circuitry in which the cam-operated switch has first and second fixed contacts engageable by a movable contact, and in which the relay has normally closed and normally opened contacts respectively connected in series between the fixed contacts and the timer. With this simple circuit and with the capacitor which is operative to provide a holding and delay function, a highly reliable system is provided.

This invention contemplates other and more specific objects, features and advantages which will become more fully apparent from the following detailed description taken in conjunction with the accompanying drawing which illustrate a preferred embodiment and in which.

Figure 1:
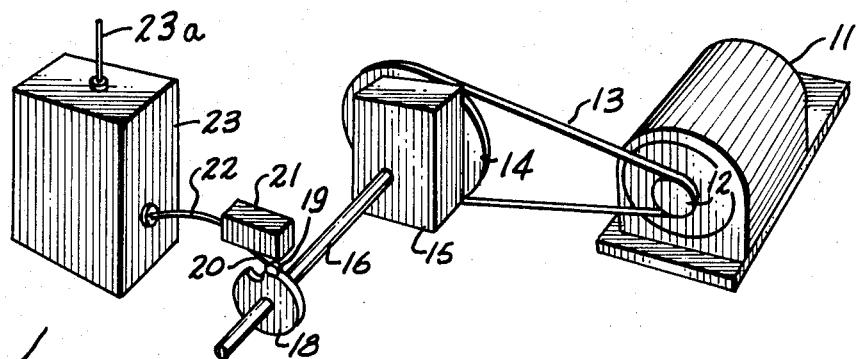
FIG. 1 is a perspective view showing a shaft rotation failure detector system constructed in accordance with the invention.

Reference numeral 10 generally designates a shaft rotation failure detector system constructed in accordance with the invention. As shown in FIG. 1, a prime mover which may be in the form of an eletcrical motor 11 drives a small pulley 12 which is coupled through a belt 13 to a large pulley 14 coupled to the input shaft of a speed reduction mechanism 15 which drives an output shaft 16 at a slow speed. The shaft 16 may, for example, be coupled to an elevator or other material handling or conveyor apparatus or may drive any type of machine. In many applications, the failure of rotation of the shaft will not be immediately detected, particularly where it is in a remote location, and considerable loss in time and money may result. Generally, the failure of rotation of the shaft is caused by a motor burnout, a belt or chain break or a break in the pin or screw which holds a sprocket or pulley in place. The system of this invention is arranged to develop an alarm signal whenever the shaft 16 stops, fails or slows down, regardless of the circumstances leading to the failure.

In the system 10, a cam 18 is keyed to the shaft 16 and is engaged by a small roller 19 carried at the end of an actuating arm 20 of a limit switch 21. The switch 21 is coupled through a cable 22 to a control box 23 which is connected through a second cable 23a to a suitable source of electrical power.

Figure 2:
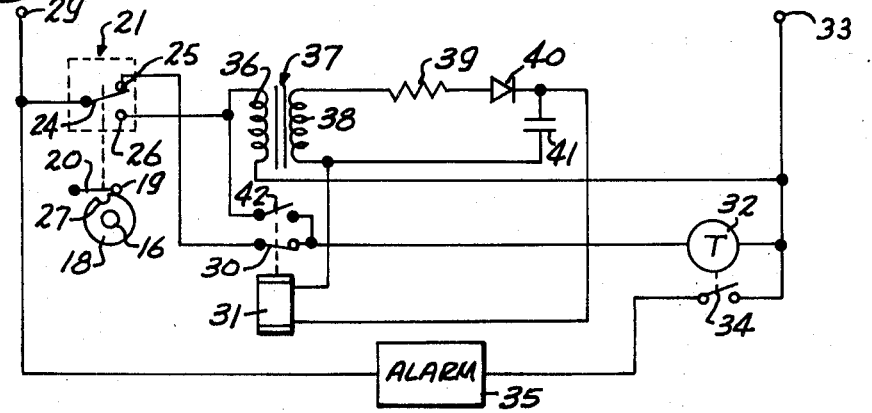
FIG. 2 is an electrical circuit diagram of the system.

Referring to FIG. 2, the limit switch 21 includes a movable contact 24 selectively engageable with first and second fixed contacts 25 and 26. When the cam roller 19 drops into a notch 27, the contact 24 engages the second contact 26, but when the cam is rotated to a position as shown, the contact 24 engages the first contact 25.

Assuming that the cam is in a position as shown, the contact 24 is engaged with the first contact 25 and the circuit is completed from a line terminal 29 through the contacts 24 and 25, through a normally closed contact 30 of a relay 31 and through a timer 32 to a second line terminal 33. Line terminals 29 and 33 may be connected to a suitable power source, such as a source of 110 volt 60 Hz. current. The timer 32 is a type known in the art which when continuously energized for a preset time interval, closes a contact 34. The contact 34 may be connected to a suitable alarm circuit, and, for example, it may be connected in series with an alarm device 35 between the line terminals 29 and 33. When the timer 32 is deenergized at a time less than the preset time interval, it is reset to an initial condition.

When the roller 19 drops into the notch 27 of the cam 18, the contact 24 engages the second fixed contact 26 and a circuit is completed through a primary winding 36 of a transformer 37 having a secondary winding 38. One terminal of the secondary winding 38 is connected to one terminal of the relay 31 and the other terminal 38 is connected through a resistor 39 and a diode 40 to the other terminal of the relay 31, a capacitor 41 being connected in parallel with the relay 31. With power applied to the primary winding 36, a voltage is developed in the secondary winding 38 which is applied through the diode 40 to rapidly charge the capacitor 41 and to energize the relay 31. The contact 30 of the relay 31 is then opened, but a normally open contact 42 of the relay 31 is immediately closed, to maintain energization of the timer 32.

With continued rotation of the cam 18, the roller 19 is moved out of the notch 27 to move the contact 24 out of engagement with the second fixed contact 26 and into engagement with the contact 25. At this time, the relay 31 is not immediately deenergized but is maintained energized by the energy stored in the capacitor 41 while the roller 19 is in the notch 27. It will be noted that the diode 40 isolates the capacitor 41 and the relay 31 from the secondary winding 38, to prevent discharge of the capacitor 41 therethrough. With continued energization of the relay 31, the circuit through the timer 32 is open, and the timer 32 is reset. After a comparatively short time interval, however, the capacitor 41 becomes discharged and the relay 31 is deenergized to place it in the initial condition as shown, whereupon the timer 32 is again energized.

If the shaft 16 continues to rotate at above a certain speed, the operation will continue as above described, and the timer 32 will be periodically reset, to prevent operation of the alarm contact 34. If, however, the shaft 16 should stop rotating at any position, or if its speed should be less than a certain speed, the timer 32 will not be reset and will remain energized to close the contact 34.

Figure 3:
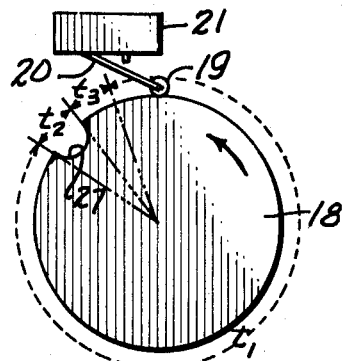
FIG. 3 is a view illustrating diagrammatically the time sequence of operation of a cam-operated switch, for explaining the operation of the system.

The operation may be further clarified by reference to FIG. 3 which diagrammatically illustrates the timing intervals. During a "run-out" time interval $t_1$, the limit switch is in a condition as illustrated, with the timer 32 being energized through the contacts 24, 25 and through the contact 30 of the relay 31. If the rotation of the shaft 16 should stop during the time interval $t_1$, or if it should move at too low a speed, the timer 32 will be energized for a time interval greater than its preset timing interval, to close the contact 34. However, if no failure has occurred during the time interval $t_1$ and the cam moves into a time interval $t_2$, at which the roller 19 drops into the notch 27, the timer 32 will remain energized as above described and at the same time, the capacitor 41 will be charged. If during the time interval $t_2$, the shaft 16 should stop, the timer 32 will remain energized, and the contact 34 will be closed after the timing interval of the timer 32.

In a timer reset interval, designated as $t_3$, when the roller 19 is moved out of the notch 27 to move the contact 24 out of engagement with the second contact 26 and into engagement with the contact 25, the timer 32 is deenergized and is reset, the energization of the relay 31 being maintained from the energy stored in the capacitor 41. If the shaft 16 should stop rotation during the time interval $t_3$, the capacitor 41 will become discharged and the relay 31 will be deenergized to complete a circuit through the timer 32. Then, after the elapse of the preset timing interval of the timer 32, the contact 34 will be closed. It is important to note that the relay 31 is reset only upon movement of the contact 24 out of engagement with the contact 26 and into engagement with the contact 25, but through the operation of the capacitor 41, the timer 32 is deenergized for a time interval sufficient for resetting thereof while at the same time reenergization thereof is insured even if the shaft should stop rotating during the time interval $t_3$. Accordingly, a highly reliable circuit is provided.

It is noted that all three of the time intervals perform a particular function, $t_2$ being used to charge the capacitor so that the timer can be reset during the interval $t_3$, $t_3$ being used to allow reset of the timer and $t_1$ being used as a run-out period for the timer.

By way of example, the total time of one revolution of the shaft can be defined by the following formula:

$$T = t_1 + t_2 + t_3$$

where:

T is the total time for one revolution of the cam, $t_1$ is the "run-out" interval, $t_2$ is the capacitor charge interval, and $t_3$ is the timer reset interval as above described.

If T is equal to $t_1$ plus $\frac{1}{10}$ T plus $\frac{1}{15}$ $t_1$, by calculation, then $t_1$ is equal to 0.85 T, $t_2$ is equal to $\frac{1}{10}$ T and $t_3$ is equal to $\frac{1}{15}$ $t_1$. With any given shaft speed, it is possible to determine the timer interval of distribution of $t_1$, $t_2$ and $t_3$. By way of example, the time of rotation of the shaft through one revolution may be on the order of from 2 to 50 seconds and the timer 32 may be adjustable to obtain any desired time interval up to 55 seconds. It will be understood, however, that the invention is not limited to any particular rate of movement of the shaft, or any particular distribution of the time intervals. It should be further noted that the cam could be arranged to actuate the switch more than once during each revolution or it could be arranged to rotate through a full revolution during a fraction of a revolution of the shaft.

It will be understood that other modifications and variations may be effected without departing from the spirit and scope of the novel concepts of this invention.

I claim as my invention:

1. In a system for detecting the failure of rotation of a shaft normally rotated at above a certain speed, control means actuatable between first and second conditions, means for alternately placing said control means in said first and second conditions in response to continuous rotation of the shaft, timer means arranged to develop an output signal in response to energization thereof for a certain time interval greater than the timer interval between actuation of said control means to said first condition during rotation of the shaft at said certain speed, reset means for resetting said timer means only in response to actuation of said control means from said second condition to said first condition, and energizing means for energizing said timer means following actuation of said control means to said first condition and maintaining energization of said timer means with said control means in both said first and second conditions.

2. In a system as defined in claim 1, said reset and energizing means including energy storage means for storing energy in said second condition of said control means, and holding means utilizing the energy stored in said energy storage means to allow resetting of said timer means and to prevent energization thereof until after elapse of a certain time interval following actuation of said control means from said second condition to said first condition.

3. In a system as defined in claim 2, said storage means including a capacitor and said holding means comprising a relay in parallel with said capacitor, and energizing means for energizing said relay and said capacitor only in said second condition of said control means.

4. In a system as defined in claim 3, said energizing means including a diode connected in the energization circuit of said relay and operative to allow the energy stored in said capacitor to maintain energization of said relay for said certain time interval following actuation of said control means from said second condition to said first condition.

5. In a system as defined in claim 1, said control means comprising an electrical switch having a movable contact and first and second fixed contacts respectively engaged by said movable contact in said first and second conditions of said control means.

6. In a system as defined in claim 5, cam means arranged for rotation by the shaft to actuate said switch means.

7. In a system as defined in claim 5, means connecting said movable contact to a power source, said reset and energizing means comprising a relay having normally closed and normally opened contacts respectively connected in series between said first and second fixed contacts and said timer means.

8. In a system as defined in claim 7, relay energizing means connected to said second fixed contact for energizing said relay in said second condition of said control means.

9. In a system as defined in claim 8, a capacitor in parallel with said relay to be charged in said second condition of said control means and to maintain energization of said relay following actuation of said control means from said second condition to said first condition.

10. In a system as defined in claim 9, a diode in circuit with said relay to permit rapid charging of said capacitor and energization of said relay upon actuation of said control means from said first condition to said second condition thereof while allowing the energy stored in said capacitor to maintain energization of said relay for said certain time interval following actuation of said control means from said second condition to said first condition.

References Cited

UNITED STATES PATENTS

| | | | |
|---|---|---|---|
| 2,462,655 | 2/1949 | McHenry | 340—271 |
| 2,807,014 | 9/1957 | Rickert | 340—271 |
| 2,941,195 | 6/1960 | McNair | 340—271X |
| 3,171,065 | 2/1965 | King et al. | 317—151X |
| 3,284,788 | 11/1966 | Hudson | 340—271X |
| 3,435,298 | 3/1969 | Atkins et al. | 318—484X |

ALVIN H. WARING, Primary Examiner

P. PALAN, Assistant Examiner

U.S. Cl. X.R.

307—141.8; 317—141, 151; 340—267